US011378389B2

(12) United States Patent
Santanera

(10) Patent No.: US 11,378,389 B2
(45) Date of Patent: Jul. 5, 2022

(54) DEVICE FOR DETECTING THE PROFILE OF A TIRE TREAD, AND RELATED DETECTION METHOD

(71) Applicant: Suntekne S.r.l., Turin (IT)

(72) Inventor: Cesare Santanera, Turin (IT)

(73) Assignee: SUNTEKNE S.R.L., Turin (IT)

( * ) Notice: Subject to any disclaimer, the term of this patent is extended or adjusted under 35 U.S.C. 154(b) by 0 days.

(21) Appl. No.: 16/803,422

(22) Filed: Feb. 27, 2020

(65) Prior Publication Data

US 2020/0278196 A1 Sep. 3, 2020

(30) Foreign Application Priority Data

Mar. 1, 2019 (IT) .................. 102019000003029

(51) Int. Cl.
*G01B 11/22* (2006.01)
(52) U.S. Cl.
CPC .................... *G01B 11/22* (2013.01)
(58) Field of Classification Search
CPC ............... G01B 11/25; G01M 17/027
USPC .................................. 356/600–640
See application file for complete search history.

(56) References Cited

U.S. PATENT DOCUMENTS 6,327,333 B1 * 12/2001 Uchida ............... G01M 17/028
378/58
2013/0293700 A1 11/2013 Yang
2015/0330773 A1 11/2015 Uffenkamp et al.

FOREIGN PATENT DOCUMENTS

DE 102006062447 A1 7/2008
EP 3407010 A1 11/2018

OTHER PUBLICATIONS

Italian Search Report and Written Opinion dated Nov. 19, 2019.

* cited by examiner

*Primary Examiner* — Tri T Ton
(74) *Attorney, Agent, or Firm* — Heslin Rothenberg Farley & Mesiti P.C.; Victor A. Cardona, Esq.

(57) ABSTRACT

A device for detecting the profile of a tread includes a light source, a mask configured for receiving a light emission of the light source and permeable to the light emission in correspondence of a slit provided therein. The slit is configured for generating, when traversed by the light emission, a light curtain. At least one image-acquisition device is configured for acquiring a projection of the light curtain on a tread, and a data-processing unit is operatively connected to the image-acquisition device for reception of image data acquired thereby.

14 Claims, 7 Drawing Sheets

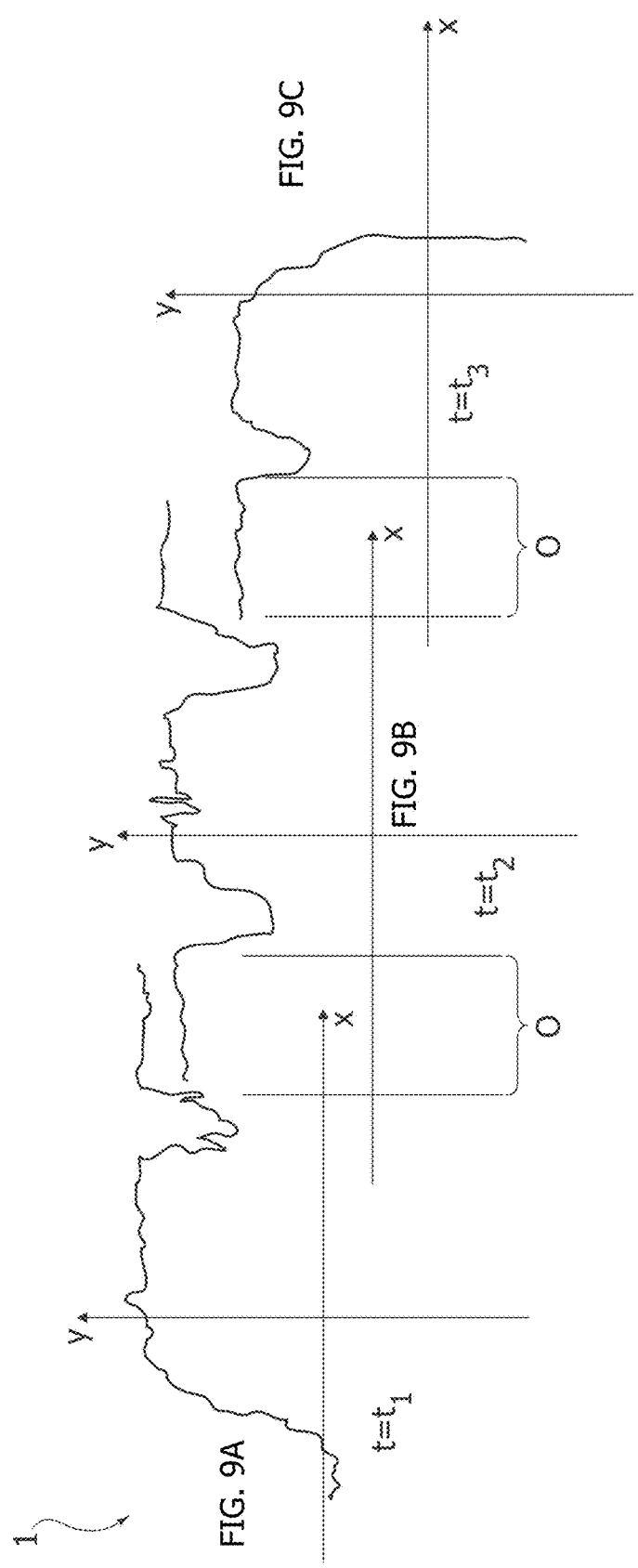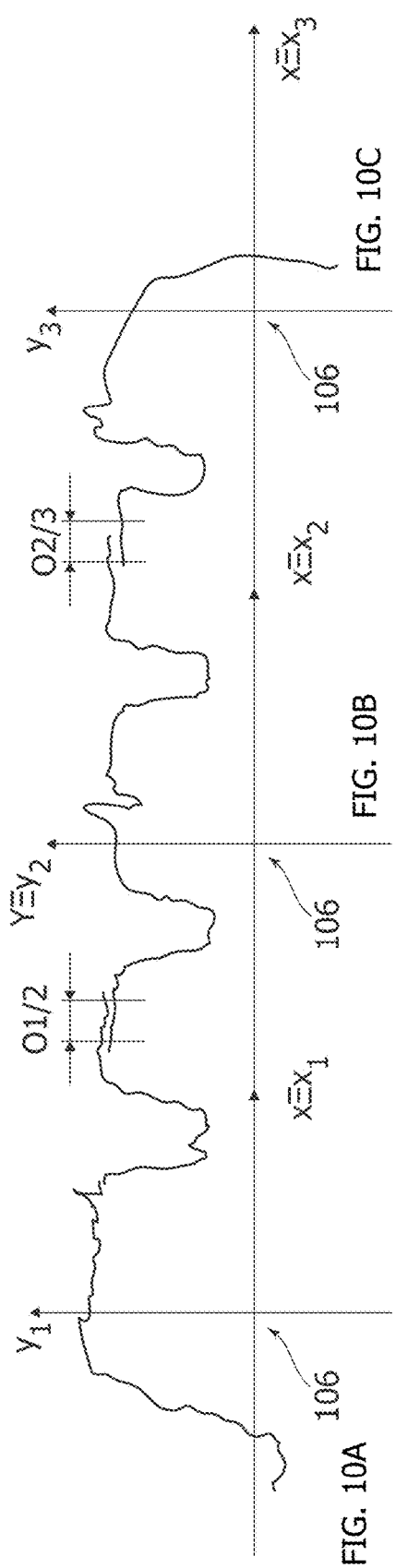

DEVICE FOR DETECTING THE PROFILE OF A TIRE TREAD, AND RELATED DETECTION METHOD

CROSS REFERENCE TO RELATED APPLICATIONS

This application claims priority from Italian Patent Application No. 102019000003029 filed on Mar. 1, 2019, the entire disclosure of which is incorporated herein by reference.

FIELD OF THE INVENTION

The present invention relates to devices for detecting the profile of a tread, in particular a tread of a motor-vehicle tire.

PRIOR ART AND GENERAL TECHNICAL PROBLEM

Detection of the profile of the tread of tires of a motor vehicle is required in certain jurisdictions as part of the activity of periodic ascertainment and check-up of motor vehicles in order to verify perfect efficiency thereof. Testing of tread wear is moreover useful for predicting the residual duration of the tire, and possibly for correcting the alignment of the wheels and in general the parameters of attitude of the vehicle.

Currently, the profile of the tread of tires of a motor vehicle is preferentially measured using portable devices, via which the operator scans the surface of the tread that is to undergo testing. There exist many types of devices, from the simplest (mechanical devices or contact devices, which measure one groove at a time) to the most complex, which use laser triangulations.

Neglecting the purely mechanical devices, known optical devices, which use laser, are rather costly in so far as they require, inter alia, the use of collimated light sources (such as a laser light source) for their operation. Moreover, use of a laser light source is, in certain conditions, liable to render the detection devices less robust in regard to the environment in which they are to operate. Frequently, handling of these devices is also relatively complex: proper use frequently goes beyond the skills of the average operator, and the quality of the measurement is affected by the skills of the operator himself.

OBJECT OF THE INVENTION

The object of the present invention is to solve the technical problems mentioned previously. In particular, the object of the present invention is to provide a device for detecting the profile of a tread that will be inexpensive to produce, accurate in the measurement irrespective of the skill of the operator, and robust in regard to the environment in which it is to operate.

SUMMARY OF THE INVENTION

The object of the present invention is achieved by a device and by a method having the features forming the subject of the ensuing claims, which form an integral part of the technical disclosure herein provided in relation to the invention.

BRIEF DESCRIPTION OF THE DRAWINGS

The invention will be now described with reference to the attached drawings, provided purely by way of non-limiting example, and wherein:

FIGS. 9A-9C illustrate an acquisition of image data that can be implemented by means of the device of FIGS. 1, 1A, and 2; and FIGS. 10A-10C illustrate an acquisition of image data that can be implemented by means of the device of FIG. 5.

DETAILED DESCRIPTION

Figure 1:
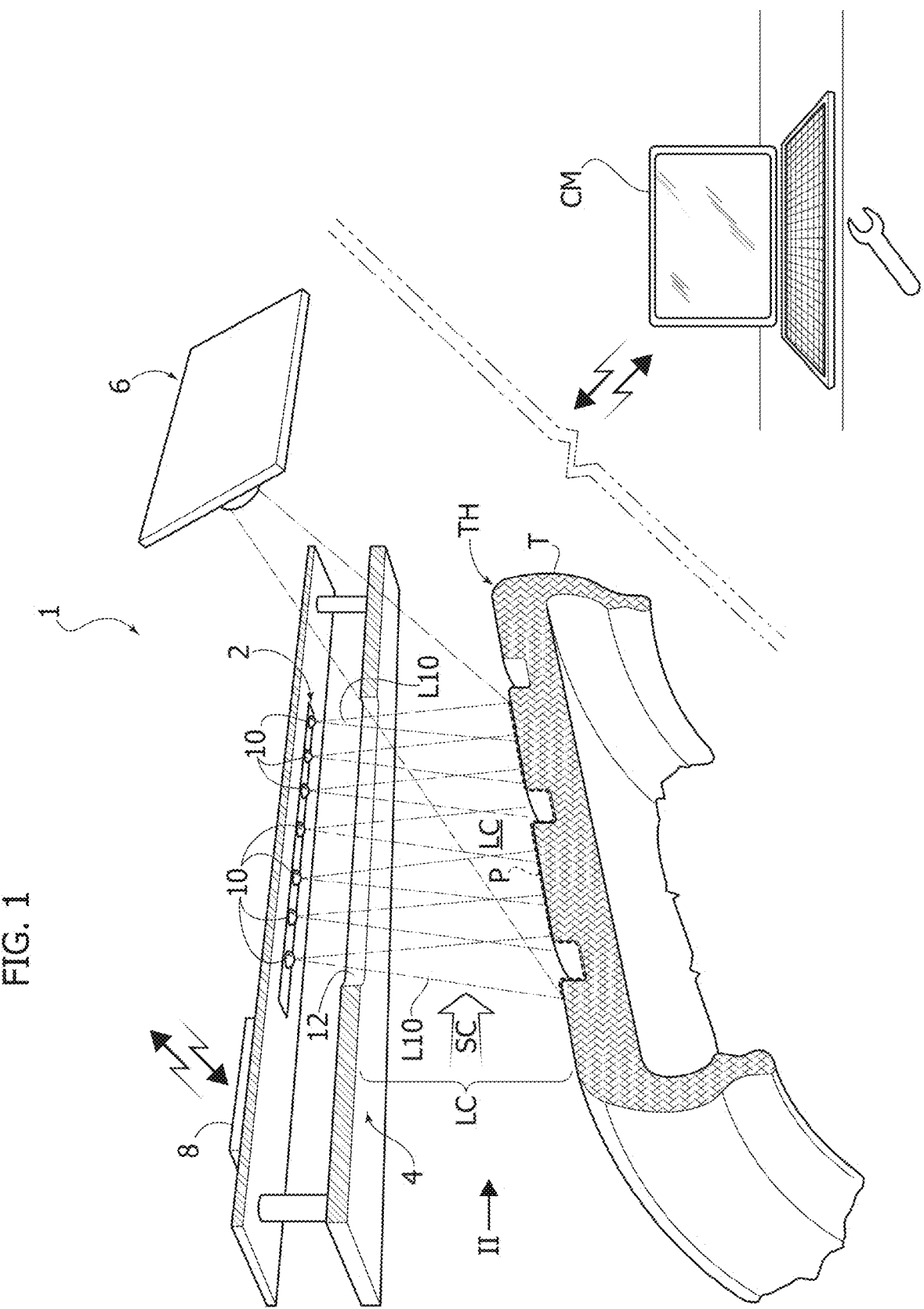
FIG. 1 is a schematic perspective view of a detection device according to a first embodiment of the invention.

The reference number 1 in FIG. 1 designates as a whole a device for detecting a profile of a tread according to a first embodiment of the invention. The device 1 comprises a light source 2, a mask 4, at least one image-acquisition device 6, and a data-processing unit 8 operatively connected to the image-acquisition device 6. The processing unit may be incorporated in part or entirely within the device 1. The image-acquisition device is preferably provided as a video camera with an acquisition rate of between 12 fps and 60 fps, possibly controlled by means of an image pre-processing application or algorithm in order to enable real-time extraction of the fraction of interest of the image, eliminating the non-useful fraction.

The light source 2 is preferably a light source with linear extension, which in this embodiment comprises a linear array of concentrated light sources 10, in particular light-emitting diodes (LEDs) with emission in the visible light spectrum. Alternatively, in further preferred embodiments, it is possible to use non-collimated or low-collimation laser diodes. The latter possibility is contemplated, for example but not exclusively, for embodiments of the device 1 (and in general of the device according to the invention), for the detection of the profile of a tread of a tire for aircraft (for example, for civil aircraft).

The light emission of each concentrated source 10 is associated to the reference L10, and, for convenience of representation, in FIG. 1 it is represented as if it were sectioned in a plane.

Figure 4:
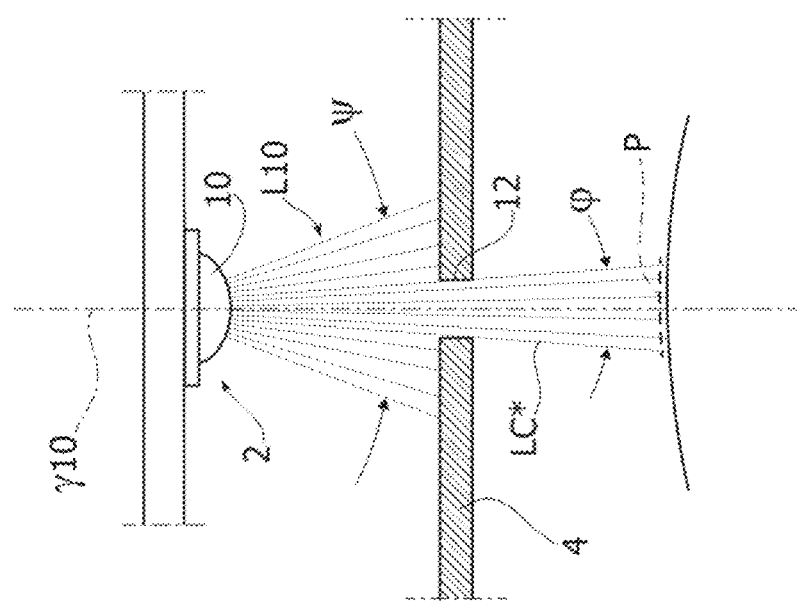
FIG. 4 is an orthogonal view corresponding to FIG. 3, partially sectioned.
Figure 3:
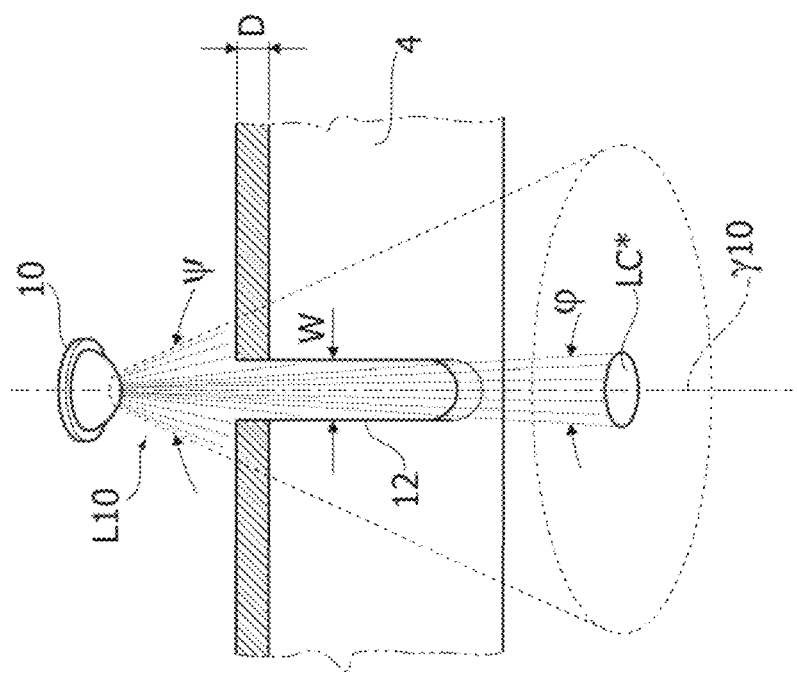
FIG. 3 is a schematic perspective view of the interaction between a light source of the device according to the invention and a mask of the device itself, with definition of a light curtain.

In practice, with reference to FIGS. 3 and 4, the light emission L10 has—in the case of a concentrated source corresponding to a light-emitting diode—the shape of an elliptical cone with vertex set in close proximity of the source itself.

In any case, the source 2, whether single or made up of a plurality of concentrated sources, is a non-collimated light source.

The mask 4 comprises a slit 12 with linear extension, with respect to which the source 2 extends in a parallel direction and—preferably—in a collinear position.

Figure 7:
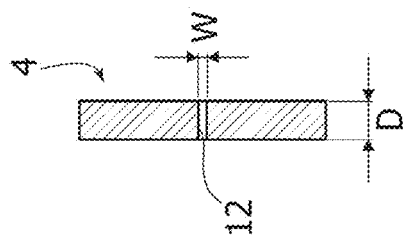
FIG. 7 is a cross-sectional view according to the trace VII-VII of FIG. 6.
Figure 6:
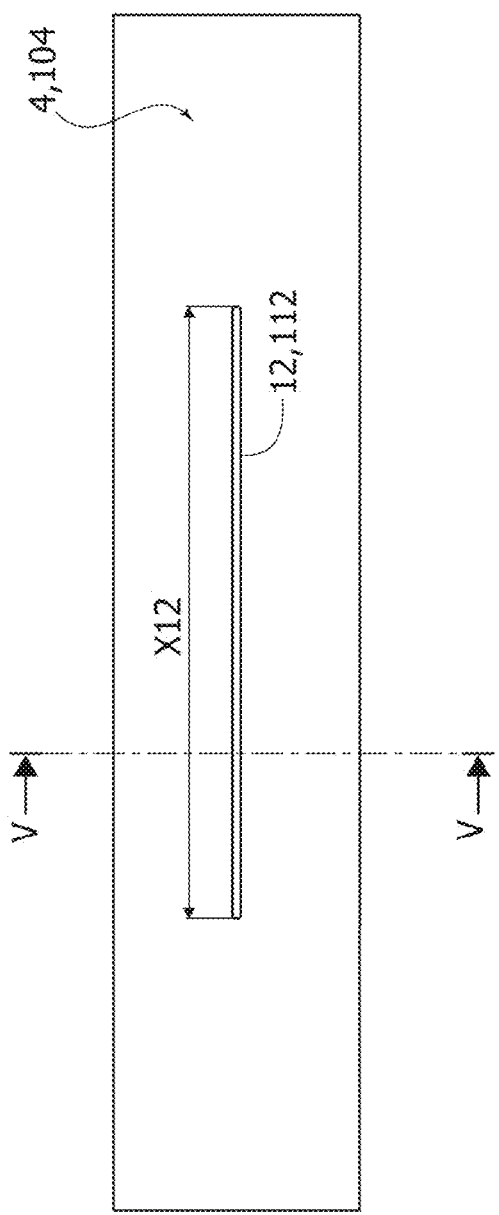
FIG. 6 is a plan view of a component of the device according to various embodiments of the invention.
Figure 8:
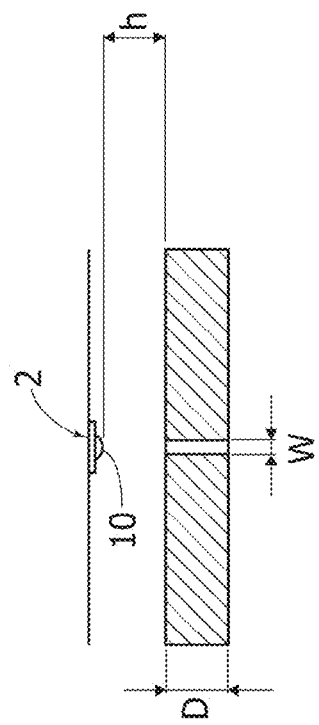
FIG. 8 is a partially sectioned view that illustrates a relative positioning between two components of the device according to various embodiments of the invention.

With reference to FIGS. 6 to 8, the slit 12 is provided (as a through slit) in the mask 4 in such a way that, named W a width of the slit 12 and named D a depth of the slit 12, a ratio W/D is comprised between 0.05 and 1.

Figure 5:
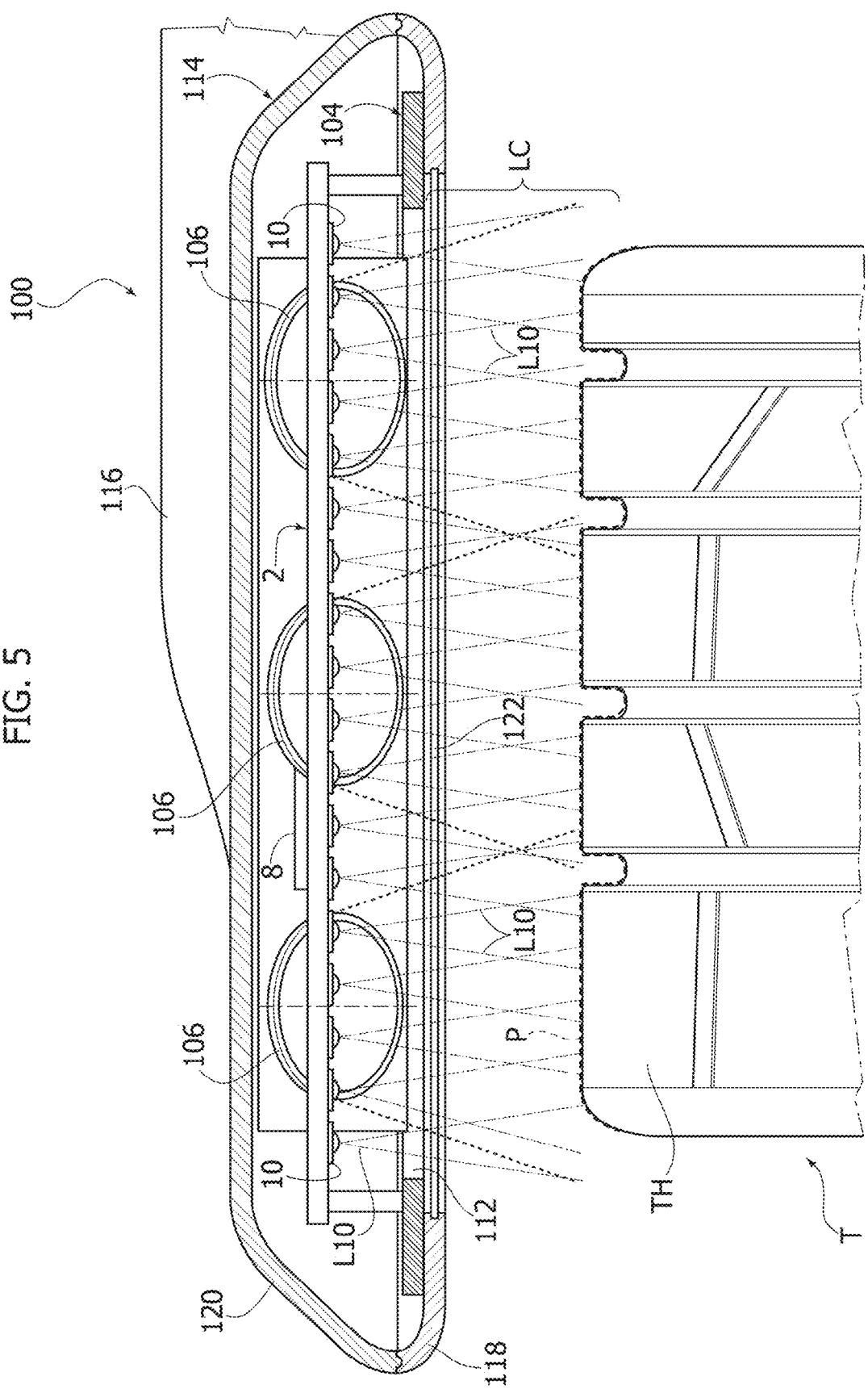
FIG. 5 is a sectioned and schematic front view of a detection device according to a second embodiment of the invention.

In general, with reference to FIGS. 4 to 6, the width W of the slit 12 is comprised between 0.1 mm and 0.4 mm, whereas the depth D of the slit 12 is generally comprised between 0.4 mm and 2 mm.

In addition, named X12 a length of the slit 12 in the main direction of extension thereof, this length—given the same ratio W/D—can vary on the basis of the embodiment of the device according to the invention and may, in particular, be chosen in such a way as to cover only a portion of the width of a motor-vehicle tread (with reference to the dimensions most widely encountered on the market or in any case to the requirements of the user, which may comprise also twin tires) or else may be sized in such a way as to extend along the entire transverse extension of the tread. The latter is the case of FIG. 3, as will be described in detail hereinafter.

With reference to FIG. 8, the light source 2 is preferably positioned at a distance h from the level of the slit 12 that is comprised between 1 mm and 10 mm, preferably between 3 mm and 10 mm.

Whatever the technology adopted for the light source 2 (for example, light-emitting diodes functioning in the visible or laser diodes), the distance h is in general the distance between the surface of the mask 4 (in which the slit is obtained) exposed to the source 2 and the optical centre of the light source. Many light sources commonly available comprise—even when they are classified as non-collimated or low-collimation sources—an internal lens, so that the optical centre is evaluated in relation to the characteristics of the internal lens. On the hypothesis where the light source is without the internal lens, the optical centre is on the emitting surface.

Figure 1A:
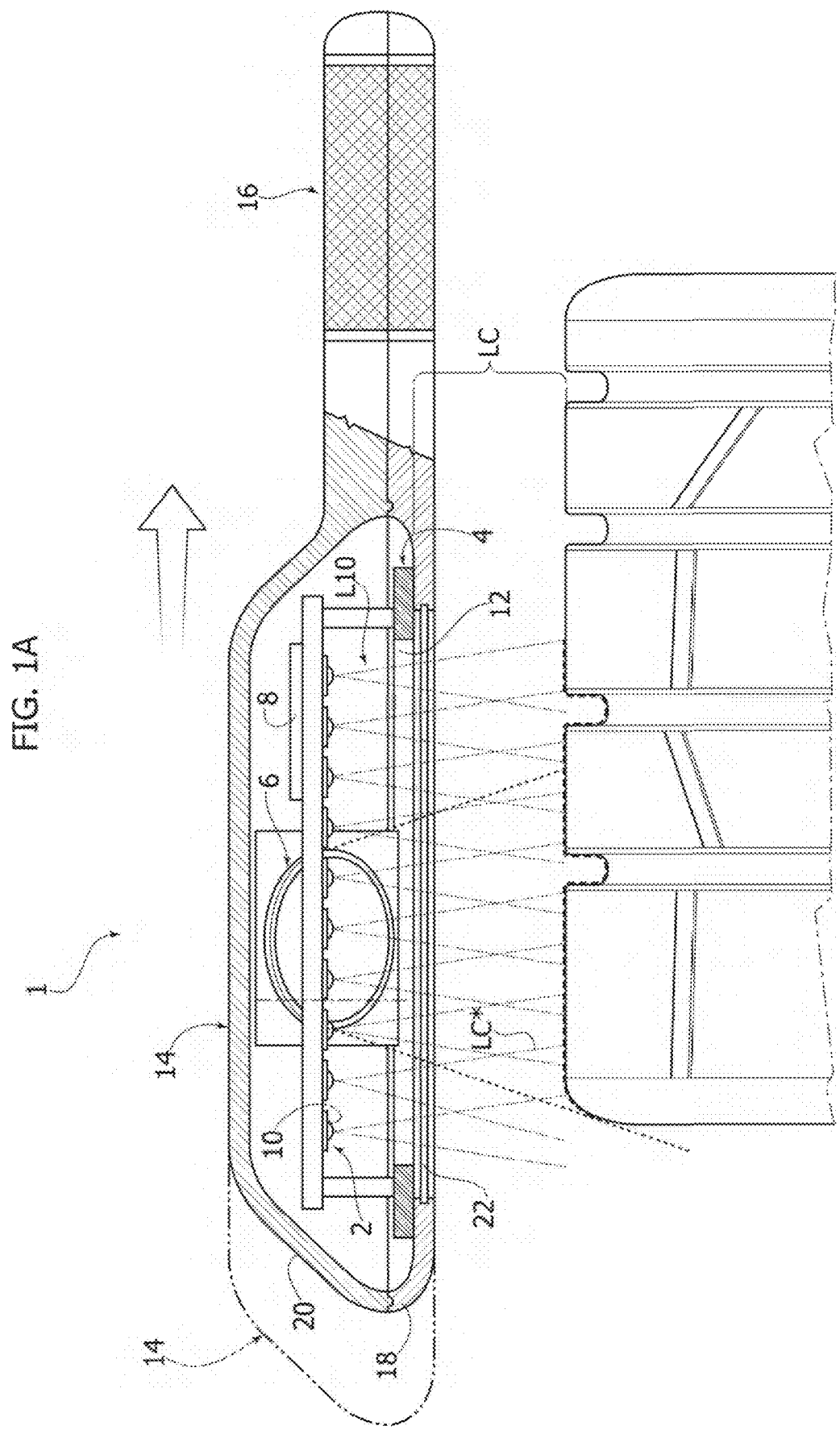
FIG. 1A is a cross-sectional view of the device of FIG. 1.
Figure 2:
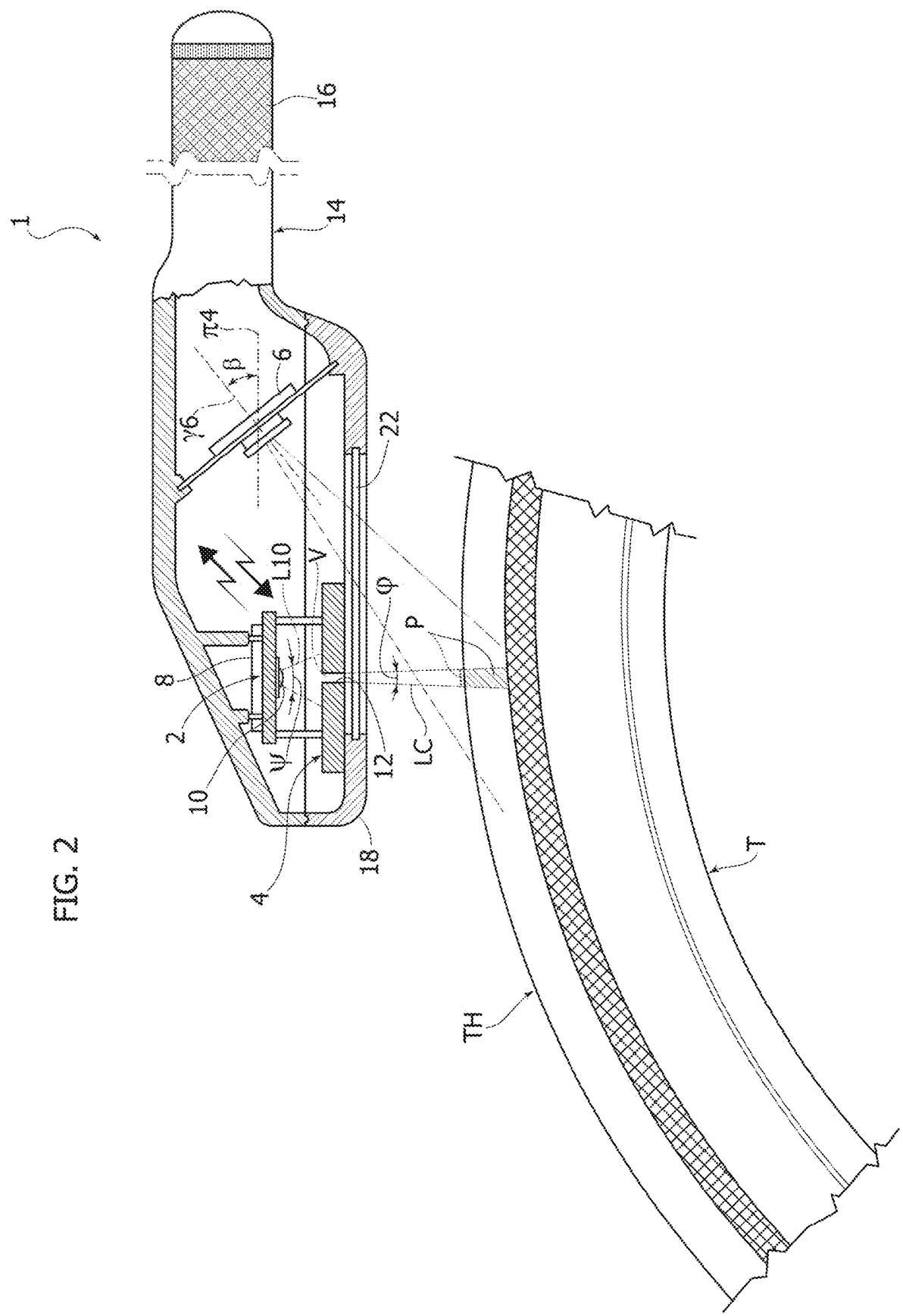
FIG. 2 is a cross-sectional view according to a plane orthogonal to the plane of section of FIG. 1A.

With reference to FIGS. 1A and 2, these illustrate schematically a layout of the components of the device 1 within a casing 14 of a portable instrument.

The casing 14 comprises a grip 16 (that can be oriented at least in two possible directions, one of which, the preferred one, is shown in FIG. 1A, and the other is shown in FIG. 2), and is preferably made up of a pair of shells of plastic material 18, 20 (or more than two shells, according to the constraints existing for production thereof by means of injection moulding or by means of forming of some other type). The shell 18 houses a transparent screen 22 permeable to the light emission L10 coming from the source 2 in order to protect the internal components of the device from contamination by external agents.

As may be noted in the view of FIG. 2, the image-acquisition device 6 is set, with respect to the mask 4, in such a way that an optical axis γ6 thereof is inclined by an angle β with respect to a plane of reference π4 parallel to the plane of the slit 12. The angle β is preferably comprised between 45° and 70° according to the need.

As visible in FIGS. 1A and 2, via the casing 14 the device 1 substantially assumes the form of a hand-held device by means of which an operator can carry out a manual scan of a tread of a motor-vehicle tire. The global shape of the casing 14 of the device 1 may in any case vary according to the requirements, for example according to whether the device incorporates a screen or not, and/or also other components such as a video camera for photographing the vehicle or the numberplate thereof, or else again a barcode-reader device for detecting the chassis number of the vehicle.

Operation of the device 1 is described in what follows.

With reference, in particular, to FIGS. 1, 3, and 4, the light source 2 is configured for producing a non-collimated light emission, which, in the embodiment of FIG. 1, consists of a plurality of conical light emissions from each of the LEDs 10 (or of the concentrated sources) that impinge upon the mask 4.

The mask 4 is permeable to the light emission of the source 2 only in correspondence of the slit 12. As visible from FIGS. 3 and 4, the slit 12 lets through only the fraction of light rays of the emission L10 around the axis of each concentrated source 10. This requires the slit 12 to be positioned so as to be traversed by the axes of the concentrated sources 10, and at a distance h such that the fraction of light emission L10 will comprise rays that are as parallel as possible. In effect, a slit 12 set almost up against the sources 10 would intercept only the portions of light emission L10 with a trajectory that is very angled with respect to the axis of the source 10; the rays that pass through the slit would still be too divergent. A slit 12 that is very far from the source would let through only rays very with low divergence (hence with a narrow angle with respect to the axis of the source 10), and would hence be ideal for the application; the problem would, however, be that the light power of this small number of rays would be an excessively small fraction of the total light power emitted.

The distance h is hence chosen as a compromise, the target being to maintain a line of light on the object to be measured that is not excessively thick, but is also sufficiently sharp.

With reference to FIGS. 3 and 4, the fraction of light emission L10 of the source 2 that travels through the slit 12 is identified by the reference LC*, and the sum of all the fractions LC* gives rise to a light curtain LC with characteristics at least roughly similar to those of a collimated light emission. In particular, an angle of aperture φ of the fraction of light emission LC* is smaller than the angle of aperture ψ in any radial plane with respect to the axis of the elliptical cone that defines the light emission L10 upstream of the slit 12.

This means that the mask 4 replaces in a simple way the function of a collimator device, and in particular filters the global light emission of the source 2 letting through only the fraction necessary for creation of a curtain (or blade) of light that impinges upon the tire tread.

In greater detail, the light curtain LC that comes out of the slit 12 impinges upon a tread TH of a motor-vehicle tire T, generating a projection P that extends in a direction transverse to the tread TH throughout the extension X12 of the slit 12.

In the embodiment of FIGS. 1, 1A, and 2, the slit 12 has a dimension X12 smaller than the width of the tread TH, so that it is necessary for the operator who carries out detection of the profile of the tread TH to perform a manual transverse scan from one end to the other of the tread TH, as indicated, by way of example, by the arrow SC of FIG. 1. The conformation of the casing 14 with a grip 16 facilitates this operation, but it should in any case be borne in mind that the casing 14 may assume other shapes, for example in the case where it incorporates a screen.

The projection P of the light curtain LC on the tread TH takes the form of a line or band (according to the angle φ) that is fretted—on account of the presence of inevitable presence of grooves on the tread due to the tread pattern—, this line or band developing along the surface of the tread TH upon which the light curtain impinges. The projection P is then framed and acquired as complex of data by the image-acquisition device 6. The complex of data acquired by the device 6 comprises one set of frames for each position of the device 1 with respect to the tread TH resulting from manual scanning thereof, according to the acquisition rate of the video camera 6.

FIGS. 9A-9C exemplify a set of frames acquired during a scan of the tread TH by means of the device 1. Each diagram shows—for convenience of representation—a single frame acquired at an instant in time (if the unit of time considered were the second, s, then the diagram should comprise k partially overlapping curves, where k is the number of frames per second—fps—that the device 6 is able to acquire). The total number of frames acquired is equal to the acquisition rate measured in fps multiplied by the total time of activation of the device 1 (it is assumed that the user activates the device at the start of scanning and de-activates it at the end, by means of one or more pushbuttons; e.g., a single pushbutton could be kept depressed during acquisition). The curves shown in FIGS. 9A-9C represent, net of the signal disturbance, the image of the projection P generated by the light curtain LC when it impinges upon on the tread TH, as acquired by the device 6.

The diagram of FIG. 7A is referenced to the instant $t=t_1$, that of FIG. 7B to the instant $t=t_2$, and that of FIG. 7C to the instant $t=t_3$, with $t_1<t_2<t_3$.

As is evident from the figure, at each instant a portion of the profile of the tread is acquired, and the various portions are recombined in the data-postprocessing stage to return the image of the profile of the tread TH. The acquisitions at each instant exhibit a certain degree of overlapping with the acquisitions at the immediately previous and immediately subsequent instants: these overlapping portions are identified by the reference O and may reach—for each instant—a value of 50% of the acquisitions made at the previous instant and at the subsequent instant.

Overlapping is necessary for a correct recombination of the various frames acquired to obtain the global profile of the tread.

The image-acquisition device 6 then transmits the data to the processing unit 8, which is configured for operative communication with an external computer CM, for example by means of the Bluetooth communication protocol or by means of some other type of radiofrequency transmission, on board which the operations of solution of the profile by composition of the images (frames) acquired by the video camera 6 during scanning are carried out. As has been mentioned, each frame, may be preliminarily processed already on board the device 1 precisely via the unit 8, for example by means of an algorithm that amplifies in the image acquired the colour of the light emission of the source 10.

In some embodiments, in the case where the unit 8 includes a microprocessor with a computational power sufficient for carrying out processing of the frames and subsequent calculation of the profile of the tread TH on board the device 1, the external computer CM is used only for projection of the data (image data and profile parameters) useful for the operator and/or for being filed.

By means of the device 1 it is hence possible to implement a method for detecting the profile of a tread that comprises:
  activating the light source 2;
  impinging upon the tread TH with the light curtain LC to generate a transverse projection P thereon;
  acquiring one or more images of the transverse projection P by means of the image-acquisition device 6; and
  processing data corresponding to the one or more images to determine a profile of the tread TH.

In the case of the device 1, impinging upon the tread TH with the light curtain LC comprises scanning the tread TH in a transverse direction (i.e., in the direction of the width of the tread, parallel to the axis of rotation of the tire T) by means of the device 1 itself, in particular by means of the light curtain LC emitted through the slit 12. The reason for this procedure—as has been described—is that the slit 12 does not extend throughout the width of the tread TH.

With reference to FIG. 5, a second embodiment of the device according to the invention is identified by the reference number 100. The reference numbers that are identical to the ones already used for the device 1 designate the same components. The device 100 is built in an identical way as the device 1, except for the linear dimensions of the mask 4 and light source 2, and for the number of image-acquisition devices.

Unlike the device 1, the device 100 is configured for static operation; i.e., it does not require scanning of the surface of the tread TH by the operator. This is possible thanks to the fact that the mask 4 is replaced by a mask 104 provided with a slit 112 having an extension equal to or greater than a reference extension, which represents a maximum value of tread width for the tires in a given segment of sizes. The slit 112 is characterized by the same ranges of the ratio W/D already described in detail in relation to the mask 4.

In the device 100, the arrangement of the components does not change as compared to the device 1; i.e., all the specifications in terms of relative positioning of the components (distance h, angle already described can still be applied, in particular as regards the position of the light source 2 with respect to the mask 104.

To compensate for the greater extension of the slit 112 as compared to the slit 12, the device 100 comprises a greater number of image-acquisition devices 106, and in particular—in the embodiment shown here—instead of the single device 6 of FIG. 1, there are now three image-acquisition devices (preferably video cameras) arranged spaced apart in the main direction of extension of the slit 112. Clearly, on the basis of the extension of the slit 112, the number of devices 106 may be varied accordingly, from a minimum of two (if the device were single, the embodiment would correspond to that of FIGS. 1 and 2) to a maximum depending upon the largest tread width that is to be inspected. Also the desired resolution/measurement accuracy affects the number of video cameras.

The device 100 can hence be provided in various versions that differ as regards the length of the slit 112 for corresponding tire ranges, where each version is configured for static scanning of a given range of tread widths, where each range may reflect a corresponding class of vehicles. Each device 100 conceived for a range of tires of larger size is able to scan statically also ones of smaller size, whereas the opposite does not apply. To scan the surface of a tread that is off-size as compared to the length of the slit 112, it will be necessary to carry out manual scanning of the surface of the tread TH, provided that the image-processing algorithms enable processing of a dynamic scan carried out by a number of devices 106 set alongside one another.

In the case of operation in nominal conditions, i.e., with the device 100 used on a tread having a size compatible with the extension of the respective slit 112, the device 100 is kept stationary above the tread TH, while the latter is integrally impinged upon by a light curtain LC of amplitude equal to or greater than the transverse dimension thereof.

The result is that of generation of a projection P (FIG. 5) with characteristics similar to those already described, but extended without solution of continuity to the entire width of the tread TH.

FIGS. 10A-10C exemplify a set of frames acquired during (static) scanning of the tread TH by means of the device 100. Each diagram shows—for convenience of illustration—a single frame acquired at the same instant in time (if the unit of time considered were the second, s, then the diagram would comprises k overlapping curves, where k is the number of frames per second, fps, that the device 106 is able to acquire). Since the projection P of the light curtain LC is framed simultaneously and integrally by all the video cameras 106, strictly speaking it is not necessary to acquire a large number of frames. Ideally, a double series of frames (for redundancy and coherence check) is already sufficient to determine the profile of the tread TH by recombination.

The curves represented in FIGS. 10A-10C show, net of the signal disturbance, the image of the projection P generated by the light curtain LC when it impinges upon the tread TH, as acquired by each device 106. For this purpose, there are defined three local reference systems $x_1$-$y_2$, $x_2$-$y_2$, $x_3$-$y_3$, one for each device 106 of FIG. 3, and one global reference system X-Y, where the axis X coincides with each of the axes $x_1$, $x_2$, $x_3$, while the axis Y coincides, by way of example, with the axis $y2$.

Each diagram of FIGS. 8A-8C is referenced to one and the same instant $t=t_1$ (the video cameras 106 all carry out a simultaneous acquisition), and differs only as regards the spatial location of the video camera 106 with respect to the reference system X-Y.

As is evident from the figures, at each instant each device 106 acquires the portion of the profile of the tread TH within the respective field of vision (the fields of vision may preferably present overlapping areas), and the sets of images acquired at each instant are recombined in the data-postprocessing stage to yield the image of the profile of the tread TH.

Once again as a result of the static and simultaneous acquisition of the projection P, it is not necessary to envisage extensive overlaps between the fields of vision of the various video cameras 106: by way of example, the overlaps are here associated to the references O1/2 and O2/3 (the figures refer to the reference systems of each video camera 106) and have a width smaller than that of the overlaps O that characterize the partial acquisitions of FIGS. 9A-9C.

The data-processing unit 8 hence receives the frames acquired by each image-acquisition device 106 (possibly applying a pre-processing with amplification of the colour of the light emission of the source 2), and, as the sets of frames are sent to the external computer CM, they are recombined by the computer CM in such a way as to reconstruct the profile.

As for the device 1, it is possible to equip the unit with a microprocessor that will be able to carry out recombination of the data and calculation of the profile of the tread on board the instrument, and then send the results to the computer CM.

As valid consideration both for operation of the device 1 and for operation of the device 100, since the transfer function of the system is not linear, the processing unit 8 (and/or the external computer CM) is configured for extracting the profile of the projection P, and then for carrying out linearization and for fitting the information associated to the projection P into known patterns. This is possible by preliminary calibration of the system, for example using calibration tables that associate to a given sample of acquisitions of projections P respective known patterns. For example, it is possible to define statistical samples of images of projections P for each type of characteristic pattern (tabs, grooves, sipes, or the like) that can be encountered on the tread of vehicles—whether passenger, industrial, or agricultural vehicles—of most common use: during detection of the profile of the tread, the processing unit 8 and/or the computer CM compare/compares the image data corresponding to the projection P acquired via the video camera/cameras 6, 106 with the various reference samples, thus arriving (via the sample) at association of the image acquired to the corresponding (and effective) thread pattern.

The method for detecting the profile of a tread that can be implemented by means of the device 100 is hence identical, in the general definition of the various steps, to the one already described for the device 1. The only difference lies in the fact that the step of impinging upon the tread TH with the light curtain LC is carried out keeping the device 100 stationary above the tread, and in the fact that the image data come from the plurality of image-acquisition devices 106, each acting synchronously with the others and for the respective portion of tread.

It will consequently be appreciated that the devices 1, 100 according to the invention enable acquisition in an extremely fast and precise way and using components that are not readily subject to degradation in hostile environments, thus solving the technical problems mentioned at the outset. It should be noted, in particular, that the light source 2 can be provided in such a variety of solutions as to render viable also the use of low-cost non-collimated light sources (e.g., LEDs).

Of course, the details of construction and the embodiments may vary widely with respect to what has been described and illustrated herein, without thereby departing from the scope of the present invention, as defined by the annexed claims.

There should, for example, be considered the possibility of envisaging, according to the invention, also embodiments that are "intermediate" between the ones described herein, i.e., embodiments with multiple video cameras (or multiple image-acquisition devices) where the slit 12, 112 does not, however, cover the entire width of the tread TH. Such embodiments enable a higher scanning rate as compared to the device 1, or, equivalently, given the same scanning rate, a greater accuracy of measurement.

The invention claimed is:

1. A device for detecting the profile of a tread, the device comprising:
   a non-collimated light source directed toward a mask,
   said mask comprising a slit, said mask configured for receiving a light emission from said light source and permeable to a portion of said light emission through said slit in said mask,
   said slit being configured for generating, when traversed by said portion of said light emission, a light curtain on a tread,
   wherein an angle of aperture of said portion of said light emission forming said light curtain is smaller than an angle od aperture of said light source upstream of said slit when the angle of said portion of said light emission forming said light curtain is measured in a plane traverse to a longitudinal dimension of said slit,
   at least one image-acquisition device configured for acquiring a projection of said light curtain on said tread, and a data-processing unit operatively connected to said image-acquisition device for reception of image data acquired thereby.

2. The device according to claim 1, wherein said light source is a light source with linear extension.

3. The device according to claim 2, wherein said light source is parallel to said slit.

4. The device according to claim 2, wherein said light source comprises a linear array of concentrated light sources.

5. The device according to claim 1, wherein said light source has a light emission in the visible light spectrum.

6. The device according to claim 1, further including an array of image-acquisition devices arranged along said slit, each image-acquisition device of said array being configured for acquisition of a respective portion of the projection of the light curtain on a tread.

7. The device according to claim 1, wherein, a ratio of a width of the slit in a direction transverse to a main extension direction, and a depth of the slit, is between 0.05 and 1.

8. The device according to claim 1, wherein said data-processing unit is configured for communicating the data coming from said at least one image acquisition device to an external computer to determine the profile of a tread on the basis of said data.

9. A method for detecting the profile of a tread by means of a device according to claim 1, the method comprising:

activating said light source, impinging upon said tread with said light curtain to generate a transverse projection thereon, acquiring one or more images of said transverse projection by means of said at least one image-acquisition device, and processing data corresponding to said one or more images to determine a profile of said tread.

10. The method according to claim 9, wherein said impinging upon the tread comprises scanning the tread transversely by means of said device.

11. The method according to claim 9, wherein said impinging upon the tread (TH) comprises scanning the tread transversely by means of said light curtain.

12. The device according to claim 2, wherein said light source is aligned to said slit.

13. The device according to claim 3, wherein said light source comprises a linear array of concentrated light sources.

14. The device of claim 1 wherein said at least one image-acquisition device is directed toward a transparent portion to allow said at least one image-acquisition device to acquire said projection of said light curtain on said tread, said transparent portion spaced from, and separate from, said slit.

* * * * *